United States Patent Office 3,634,449
Patented Jan. 11, 1972

3,634,449
4-PHENOXY ACETAMIDO-2,3-DIMETHYL-1-PHENYL-5-PYRAZOLONES
Jean Cahn, Paris, France. Edmond Marie Canonne, Geneva, Switzerland, and Guy Lejeune, Hauts de Seine, Gaston Arthur Francois Ligny, Seine-Saint-Denis, and Dario Claude Fulvio Modigliani, Paris, France, assignors to Laboratoires Valda, Paris, France
No Drawing. Filed July 9, 1969, Ser. No. 840,495
Claims priority, application France, July 15, 1968, 159,281
Int. Cl. C07d 49/02
U.S. Cl. 260—310 A
4 Claims

ABSTRACT OF THE DISCLOSURE

Medicament comprising 4-(aryloxyacetamids)-2,3 dimethyl-1-phenyl-5-pyrazolone having as general formula:

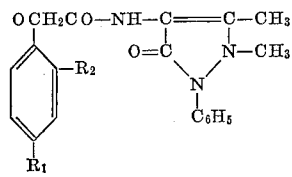

each of the signs $R_1$, $R_2$ representing an alkyl or alkoxy group having from 1 to 4 carbon atoms or a halogen atom.

---

This invention has for its object new medicaments having an antipyretic, anti-inflammatory and analgesic action comprising 4 - (aryloxyacetamids)-2,3-dimethyl-1-phenyl-5-pyrazolone complying with the following formula:

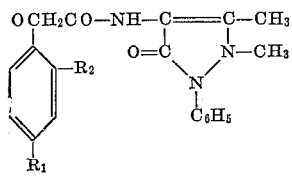

This thus refers to 4-(aryloxyacetamids)-2-3-dimethyl 1-phenyl-5 pyrazolone. In the formula $R_1$, $R_2$ may be alkyl groups such as methyl, ethyl, isopropyl or n-butyl, or alkoxy groups such as methoxy, ethoxy, isopropoxy or n-butoxy, or halogens such as fluorine, chlorine, bromine or iodine.

The 4 - (aryloxyacetamids) - 2-3 dimethyl-1-phenyl-5-pyrazolone are prepared by commencing with acid chloride of aryloxyacetic acids that is made to react on the 4-amino-2-3 dimethyl-1-phenyl-5 pyrazolone in a pyridic medium or making the acids 4-(aryloxyacetics) react on the 4 amino-1-3-dimethyl-1-phenyl-5-pyrazolone in the presence of oxychloride of phosphorus.

As has been stated, these compounds obtained according to the process described hereafter have pharmacological properties, for experiments carried out on animals in vivo and in vitro have revealed on antipyretic, anti-inflammatory and analgesic action, this action being accompanied by less toxicity than that shown by antipyrin.

We give hereafter complementary information about the toxicity of the products, their method of preparing, formulas by medical weight, clinical observations, in order to make the invention clear.

Toxicity

To illustrate the pharmacological properties of some of the compounds described hereafter, the following table shows the toxicity and the new $DL_A50$ in rats, a phenacetin mixture plus amidopyrin in equal parts being taken equally as comparison substance.

TABLE I

| Test No. | $R_1$ | $R_2$ | M.W. | M.P. | $DL_A50$, g./kg. Tests | Comparison with phenacetin amidopyrin mixture |
|---|---|---|---|---|---|---|
| 3,017 | Cl | H | 371.5 | 177–178 | 12.20 | 3.97 |
| 3,357 | OCH₃ | H | 367 | 137–138 | (¹) | 3.97 |
| 3,507 | Cl | CH₃ | 385.5 | 158–159 | (¹) | 3.97 |

¹ Exceeding 12 g./kg.

Pharmacological properties

By way of example, a study has been made of anti-inflammatory activity, analgesic activity and antipyretic activity of the derivatives of the references 3017 and 3357 given in the previous table.

Anti-inflammatory activity.—This has been measured by the oedema test with carragenine of the rat's paw. Compared to that of anti-pyrin, the activity of the two bodies studied has shown that they are very similar to each other.

Analgesic activity.—Two tests were made for measuring the analgesic effect: on the one hand the hot plate test (heat stimulus), on the other hand, the cramping test (chemical stimulus). Mice were used for both tests.

The last test, a particularly severe one, undoubtedly shows that the 3357 derivative is endowed with an accentuated analgesic power, much greater than that of antipyrin.

The results are summarised as follows:

CRAMPING TEST

| | Number of twists |
|---|---|
| References physiological water | 127 |
| Arabic gum | 146 |
| Antipyrin: | |
| 150 mg./kg | 143 |
| 300 mg./kg | 118 |
| Derivative 3017: | |
| 300 mg./kg | 110 |
| 600 mg./kg | 106 |
| Derivative 3357: | |
| 300 mg./kg | 15 |
| 600 mg./kg | 54 |

Antipyretic activity.—This activity was measured on a rabbit after an intravenous injection of anti-gonococcic vaccine containing 100 million germs per ml. While the derivative 3017 showed that it was slightly anti-pyretic, the derivative 3357 revealed an action at least as intense as that of anipyrin with a dose of 200 mg./kg.

The derivatives used in the new medicament can be obtained by the same process as that described hereafter.

METHOD OF PREPARATION

There is incorporated in a flask 20.3 g. of 4-amino-2-3 dimethyl-1-phenyl-5-pyrazolone 200 ml. of anhydrous benzine. The acid is made to react contributing the radicals sought. After the three bodies are completely dissolved 10 g. of bentonite are poured, and 15.8 g. of oxychloride of phosphorus are added drop by drop. While vigorously shaking, one heats to a flow during one hour. After cooling, the mixture is watered with an equal volume of water. The aqueous phase is isolated that is made alkaline with soda 4 N. After leaving standing for the night, one checks to see that the pH is still alkaline. Filtering is then effected on a Buchner and washing with water is done until the pH is neutral.

After drying, the product is purified with 95° alcohol at boiling temperature, the inert phase is filtered and the alcoholic fraction is allowed to remain at ambient temperature.

The crystals obtained are filtered on the Buchner and washed with 95° alcohol. A second and third crystallization are done with 50° alcohol.

EXAMPLE 1

There is incorporated in a flask: 18.65 g. of parachlorophenoxy-acetic acid, 20.3 g. of 4-amino-2-3-dimethyl-1-phenyl-5-pyrazolone, 200 ml. of anhydrous benzine. One thus obtains 4 para-chloro-(phenoxy-acetamido)-2-3-dimethyl - 1 - phenyl-5-pyrazolone. (M.P.=177–178° C.) soluble in absolute alcohol and in 50° alcohol, insoluble in water.

EXAMPLE 2

There is incorporated in a flask: 18.2 g. of para-methoxy-phenoxy-acetic acid, 20.3 g. of 4-amino-2,3-dimethyl-1-phenyl-5-pyrazolone, 200 ml. of benzine. One obtains 4 - (paramethoxy-phenoxy-acetamido) - 2-3-dimethyl-1-phenyl-5-pyrazolone. M.P.=137–138° C.

EXAMPLE 3

There is incorporated in a flask: 20.4 g. of para-chloro ortho methyl phenoxy acetic acid, 20.3 g. of 4-amino 2-3-dimethyl-1-phenyl-5-pyrazolone. The body obtained is 4-(para-chloro-orthomethyl-phenoxy-acetamido) - 2 - 3-dimethyl-1-phenyl-5-pyrazolone. M.P.=158–159° C.

These bodies are obtained with a field in the vicinity of a theoretical 50%.

The new medicament can be made up in the form of a compound, a suppository, a pill, a tablet, pomade, an injectable phial or a gelloid.

MEDICAL WEIGHT FORMULAS (1) Tablet

| | G. |
|---|---|
| Para - chloro - (phenoxy-acetamido)-2-3-dimethyl-1-phenyl-5-pyrazolone | 0.50 |

Quant. suff. of excipient for a tablet.

(2) Suppository

| | |
|---|---|
| (Para-methoxy-phenoxy-acetamido) - 2 - 3 - dimethyl-1-phenyl-5-pyrazolone | 0.50 |

Quant. suff. of excipient to make a suppository of about 2 g.

(3) Pill

| | |
|---|---|
| (Para-chloro-ortho-methyl-phenoxy-acetamido) - 2-3 - dimethyl - 1 - phenyl - 5 - pyrazolone | 0.25 |
| Para-chloro (phenoxy-acetamido) - 2 - 3 - dimethyl - 1 - phenyl - 5 - pyrazolone | 0.25 |

Quant. suff. of excipient for a pill.

(4) Cachet

| | |
|---|---|
| Para-chloro - (phenoxy-acetamido) - 2 - 3 - dimethyl - 1 - phenyl - 5 - pyrazolone | 0.25 |
| (Para-chloro-ortho-phenoxy-acetamido) - 2 - 3 - dimethyl - 1 - phenyl - 5 - pyrazolone | 0.25 |

Quant. suff. of lactose for a cachet.

(5) Tube of pomade

| | |
|---|---|
| (Phenoxy-acetamido) - 2 - 3 - dimethyl - 1 - phenyl-5-pyrazolone | 3 |

Quant. suff. excipient for a 30 g. tube of pomade.

(6) Injectable phial

| | |
|---|---|
| (Para-methoxy-phenoxy-acettmido) - 2 - 3 - dimethyl-1-phenyl-5-pyrazolone | 0.50 |

Quant. suff. excipient for a 5 ml. injectable phial.

(7) Gelloid

| | |
|---|---|
| (4 - para-chloro-ortho-methyl-phenoxy-acetamido)-2-3-dimethyl-1-phenyl-5-pyrazolone | 0.40 |

Quant. suff. excipient for one gelloid.

CLINICAL CASES OBSERVED

Observation No. 1

Mrs. Martine D.—
  36 years of age
  Patient suffering from very painful rheumatoid polyarthritis
  Swelling of the joints, Sedimentation speed distinctly diminished
  Treatment: 4 gelloids of Formula No. 7 per day for 15 days
  Evolution: favourable
  Tolerance: perfect

Observation No. 2

Mr. Gaston L.—
  42 years of age
  Localised attack of gout in the left big toe. Urecemia at 60 mg./l.
  Treatment: 2 to 4 suppositories per day of Formula No. 2, associated with cortisone during 4 days: one or two suppositories a day afterwards as maintenance treatment
  Pains stopped. Swelling reduced
  Results: excellent, allowing for the weak posology
  Tolerance: perfect

Observation No. 3

Mrs. Bernadette H.—
  65 years of age
  Coxarthrosis of the right thigh
  Treatment: 4 to 5 tablets per day of Formula No. 1 as attacking treatment
  2 to 3 tablets a day as maintenance treatment
  Evolution: very favourable
  Tolerance: perfect

Observation No. 4

Miss Simone R.—
  26 years of age
  Sub-feverish when fever abated during influenza
  Treatment: 2 cachets of Formula No. 4 per day
  Evolution: very favourable. Disappearance of cephalitis and return to normal temperature the third day
  Tolerance: perfect

Observation No. 5

Miss Micheline T.—
  19 years of age
  Catamial pains occurring at each monthly period
  Treatment: 3 pills of formula No. 3 for the first day of the period, and 2 pills on the second and third days
  Evolution: very favourable
  Pains calmed. There was no increase of the menstrual flow
  Tolerance: gastrically perfect

Observation No. 6

Mr. Jean C.—
  9 years of age
  Influenza with 38.5° C. fever. Intense cephalitis and tiredness
  Treatment: ½ tablet of formula No. 1 four times a day during 4 days. Cured on the 3rd day
  Tolerance: perfect

Observation No. 7

Mr. Jacques C.
  63 years of age
  Tendinitis, following strain during sports; intense pain
  Treatment: 4 applications of the balm of formula No. 5 per day
  Very favourable prognostic
  Result: obtained in 10 days
  Tolerance: perfect cutaneously

We claim:
1. A 4 - (aryloxyacetamide) - 2 - 3 - dimethyl-1-phenyl-5-pyrazolone, of the formula:

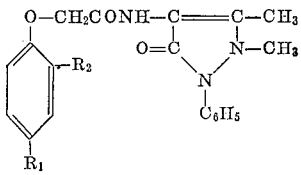

each of the signs $R_1$, $R_2$ representing an alkyl or alkoxy group having from 1 to 4 carbon atoms or a halogen atom.

2. A compound according to claim 1, comprising 4-para-chloro-(phenoxy acetamido)-2-3-dimethyl-1-phenyl-5-pyrazolone.

3. A compound according to claim 1, comprising 4-(para-methoxy-phenoxy-acetamido) - 2 - 3 - dimethyl-1-phenyl-5-pyrazolone.

4. A compound according to claim 1, comprising 4-(para - chloro - ortho - methyl - phenoxy - acetamido)-2-3-dimethyl-1-phenyl-5-pyrazolone.

References Cited

UNITED STATES PATENTS

| 1,906,200 | 4/1933 | Reuter | 260—310 A |
| 1,915,334 | 6/1933 | Salzberg et al. | 260—243 |
| 2,075,359 | 3/1937 | Salzberg et al. | 424—250 |
| 3,420,839 | 1/1969 | Banci et al. | 260—310 A |

OTHER REFERENCES

Chemical Abstracts vol 53: 4564 g. (1959) Miura et al.

S. D. WINTERS, Primary Examiner
HENRY R. JILES, Assistant Examiner